US008157555B2

(12) United States Patent
Fukabori et al.

(10) Patent No.: US 8,157,555 B2
(45) Date of Patent: Apr. 17, 2012

(54) EXTRUSION FEED DEVICE FOR COMPOSITE RESIN AND COMPOSITE RESIN MASS

(75) Inventors: Hotaka Fukabori, Kanagawa (JP); Tsuneo Imatani, Kanagawa (JP); Makoto Etoh, Kanagawa (JP); Kazunobu Watanabe, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1106 days.

(21) Appl. No.: 11/813,724

(22) PCT Filed: Jan. 12, 2005

(86) PCT No.: PCT/JP2005/000259

§ 371 (c)(1), (2), (4) Date: Jul. 11, 2007

(87) PCT Pub. No.: WO2006/075366

PCT Pub. Date: Jul. 20, 2006

(65) Prior Publication Data

US 2009/0074898 A1 Mar. 19, 2009

(51) Int. Cl.
*B29C 47/06* (2006.01)
*B29C 47/20* (2006.01)

(52) U.S. Cl. ..................... 425/132; 425/133.1; 425/381; 425/382.4; 425/462; 425/467

(58) Field of Classification Search .................. 425/132, 425/133.1, 381, 382.4, 462, 466, 467
See application file for complete search history.

(56) References Cited

U.S. PATENT DOCUMENTS 3,947,175 A * 3/1976 Melcher ........................ 425/130

(Continued)

FOREIGN PATENT DOCUMENTS

JP 62184817 A 8/1987

(Continued)

OTHER PUBLICATIONS

International Search Report of PCT/JP2005/000259, date of mailing Apr. 26, 2005.

(Continued)

*Primary Examiner* — Yogendra Gupta
*Assistant Examiner* — Joseph Leyson
(74) *Attorney, Agent, or Firm* — Westerman, Hattori, Daniels & Adrian, LLP

(57) ABSTRACT

An extrusion feed device for a composite resin capable of forming a composite resin extruded material having a variety of layer configurations not necessarily symmetrical. A plurality of cylindrical flow passages (3) and (4) for feeding a molten resin, an opening/closing valve (7) capable of opening/closing a center flow passage (36) and a cylindrical flow passage (4*a*), and a center opening/closing valve (39) capable of opening/closing the center flow passage are provided at the upstream side end part (2*a*) of a discharge passage (2) for delivering the composite resin extruded material. A main resin (30*a*) forming an outside layer is always fed from the cylindrical flow passage (3), and the other molten resin (30*b*) and/or (30*c*) as an auxiliary resin is fed, at a proper timing, from the cylindrical flow passage (4) and the center flow passage (36) on the inside into the molten resin (30*a*) on the outside by controlling the opening/closing valve (7) or the center opening/closing valve (39). Thus, the composite resin mass in a variety of forms can be provided by involving, for example, multiple types of resins in the main resin layer in the state of being not involved in each other.

5 Claims, 10 Drawing Sheets

U.S. PATENT DOCUMENTS

| | | | | |
|---|---|---|---|---|
| 3,947,177 | A * | 3/1976 | Eckardt | 425/130 |
| 4,657,496 | A * | 4/1987 | Ozeki et al. | 425/130 |
| 4,895,504 | A * | 1/1990 | Kudert et al. | 425/133.1 |
| 4,907,957 | A * | 3/1990 | Nakagawa et al. | 425/132 |
| 4,973,239 | A * | 11/1990 | Herrmann et al. | 425/135 |
| 5,104,305 | A * | 4/1992 | Kawaguchi et al. | 425/130 |
| 2002/0054929 | A1 | 5/2002 | Omi et al. | |

FOREIGN PATENT DOCUMENTS

| | | | |
|---|---|---|---|
| JP | 2000102963 | A | 4/2000 |
| JP | 2002248675 | A | 9/2002 |
| JP | 2003-39531 | A | 2/2003 |
| JP | 200333964 | A | 2/2003 |
| JP | 2003136583 | A | 5/2003 |
| JP | 200498666 | A | 4/2004 |

OTHER PUBLICATIONS

International Preliminary Report on Patentability PCT/JP2005/000259 mailed on Jul. 26, 2007.

* cited by examiner

FIG. 1-A
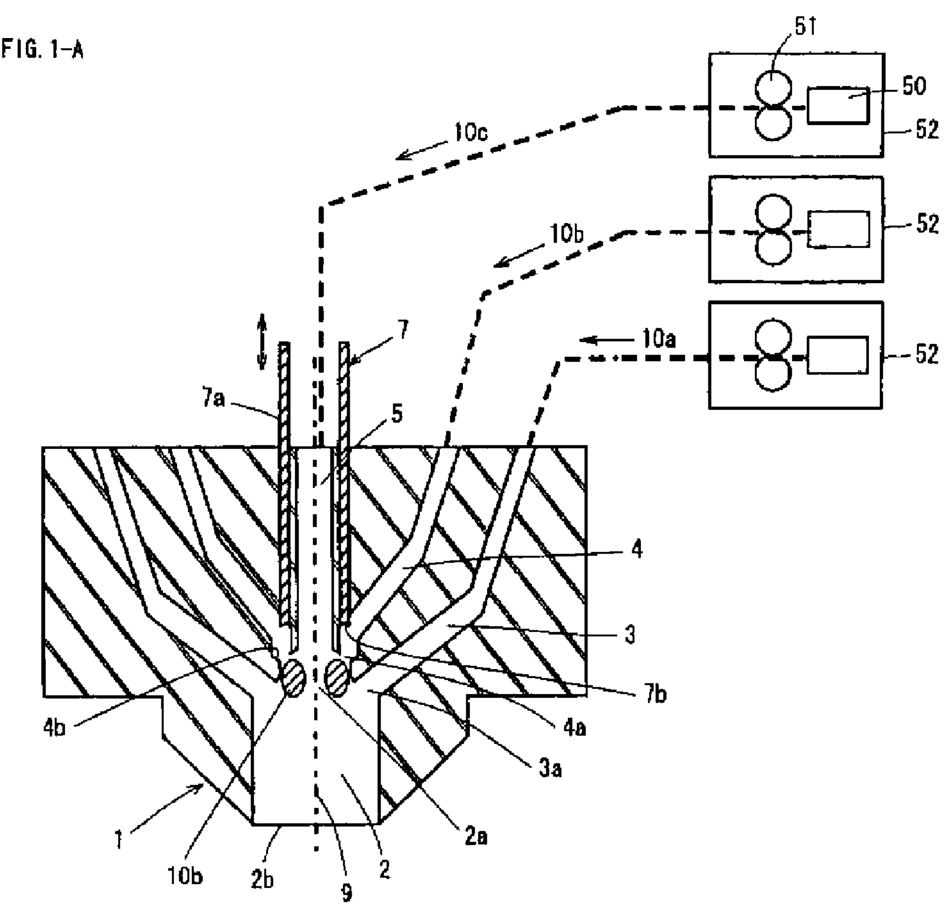
FIG. 1-B
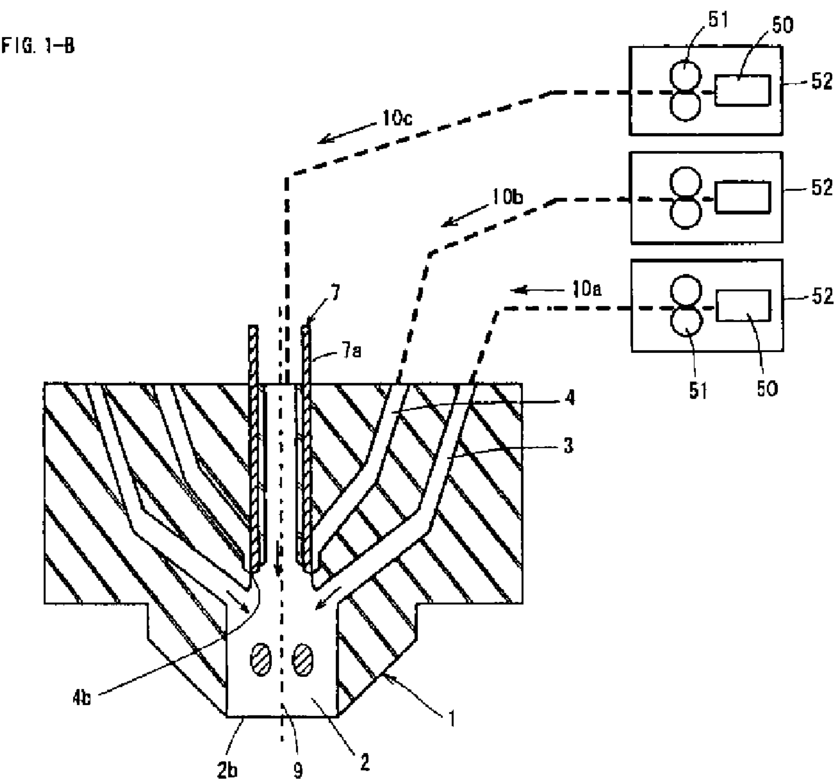

FIG. 1-C
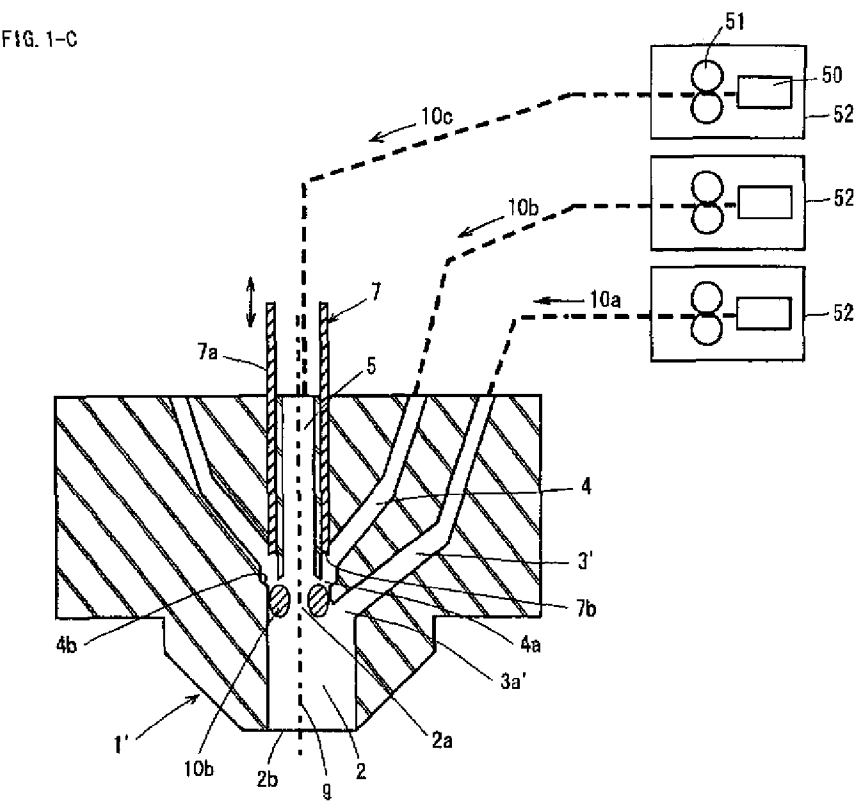
FIG. 2-A
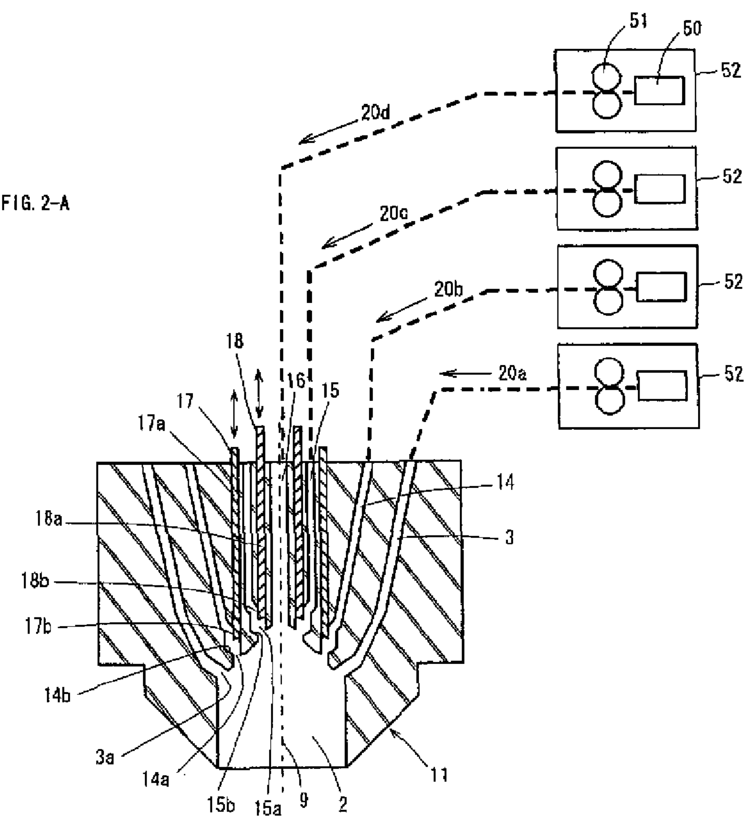

FIG. 2-B
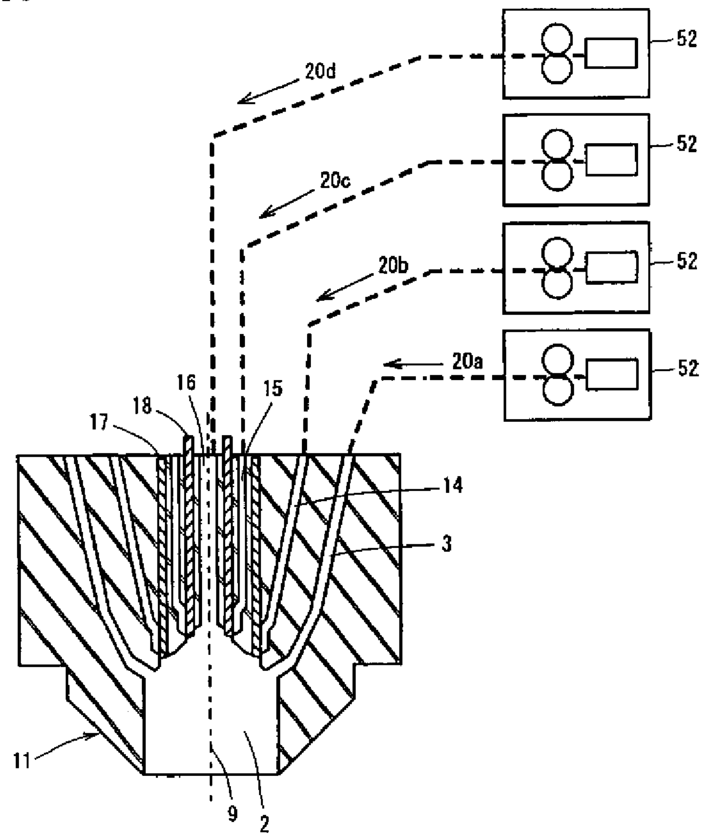
FIG. 3-A
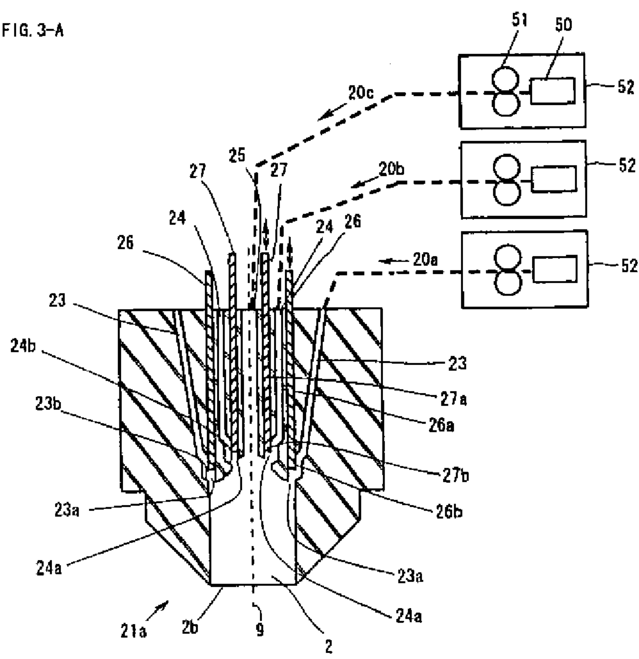

FIG. 3-B
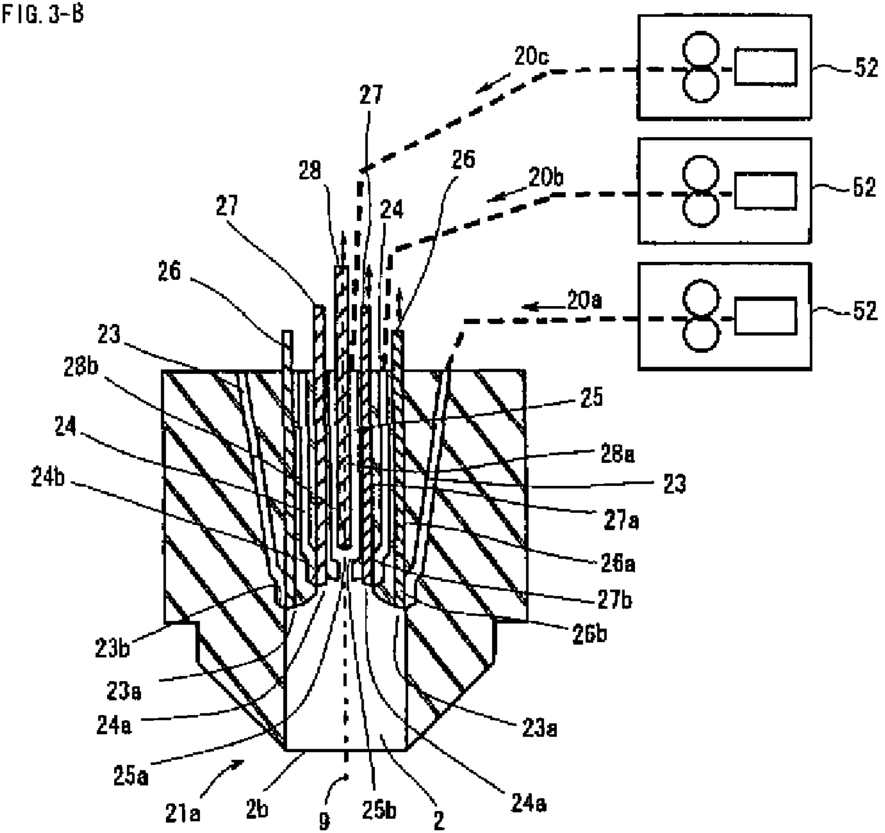
FIG. 4-A
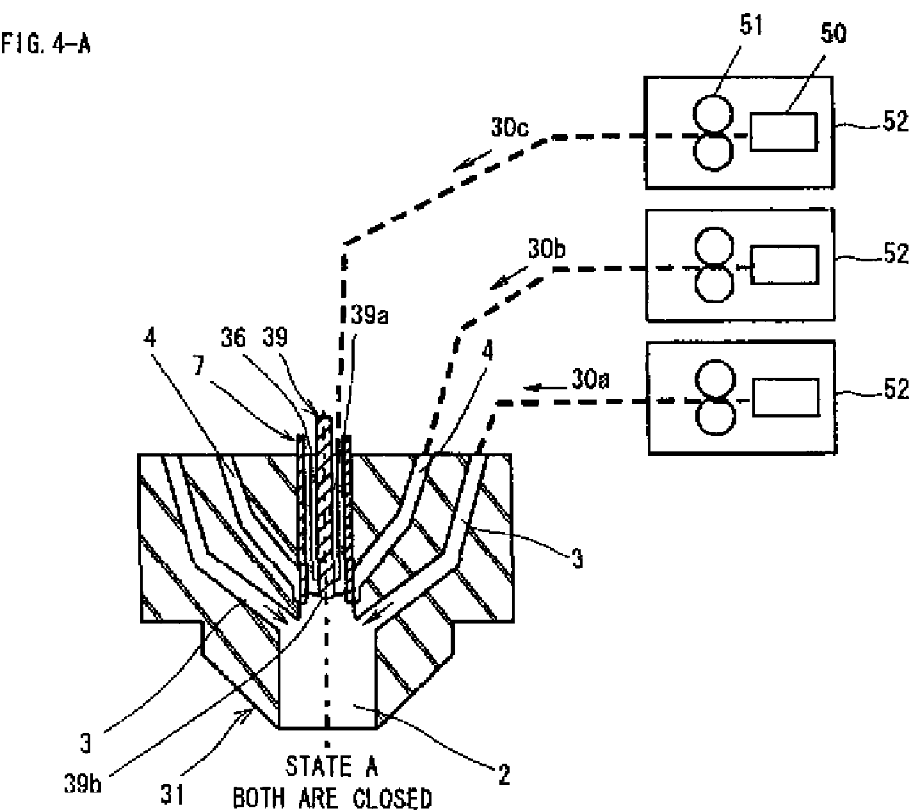

FIG. 4-B
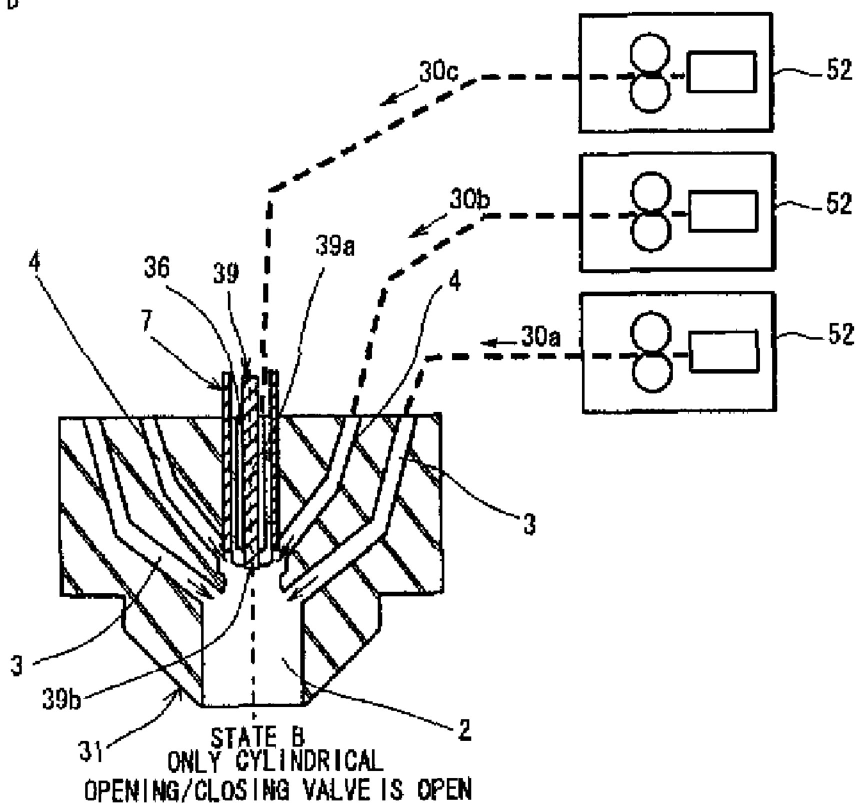
FIG. 4-C
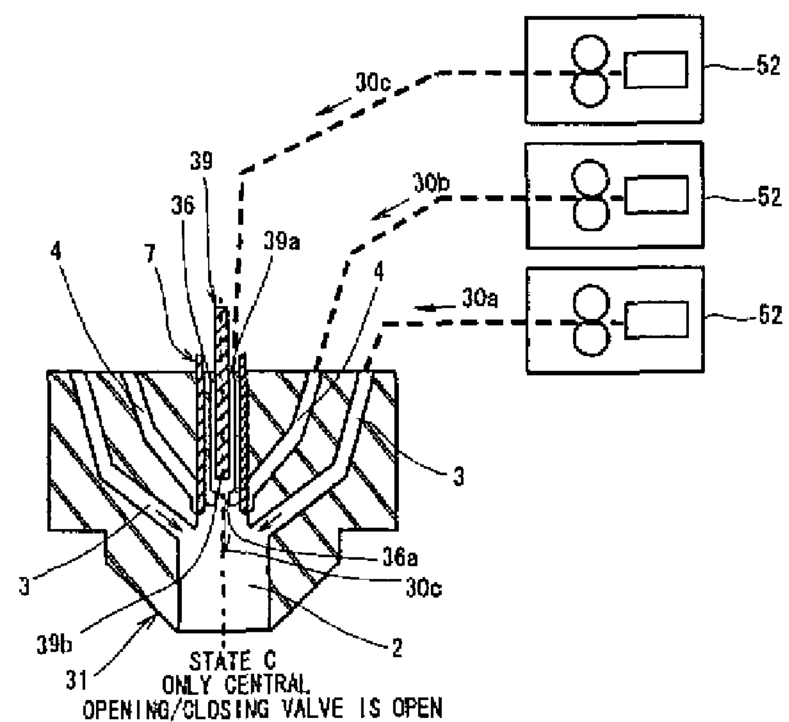

FIG. 4-D
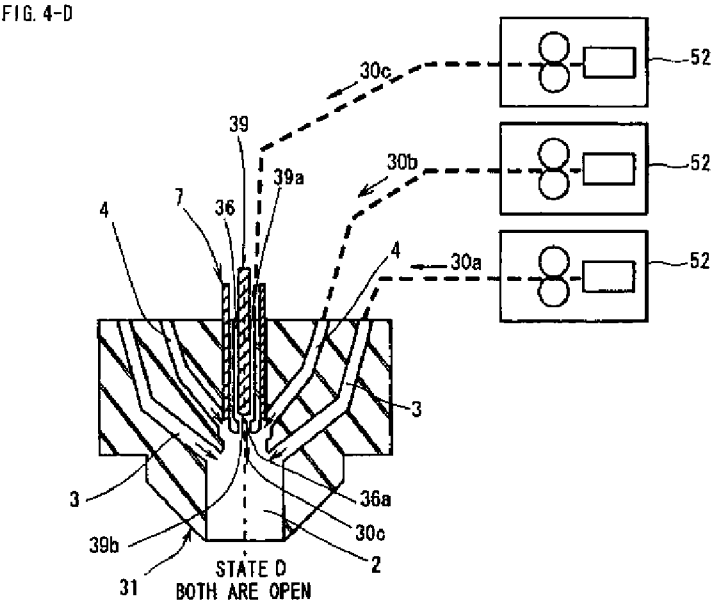
FIG. 5-A
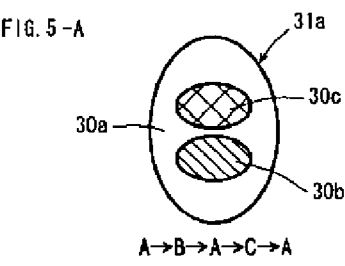
FIG. 5-B
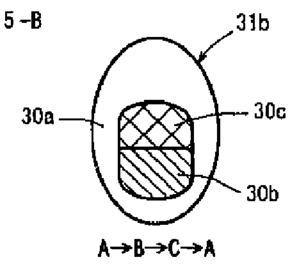
FIG. 5-C
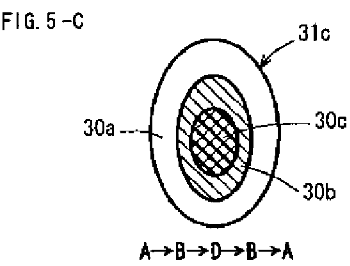
FIG. 5-D
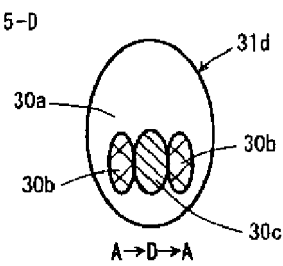
FIG. 5-E
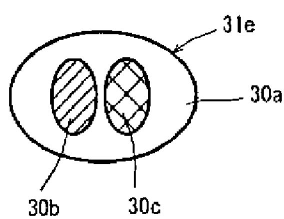

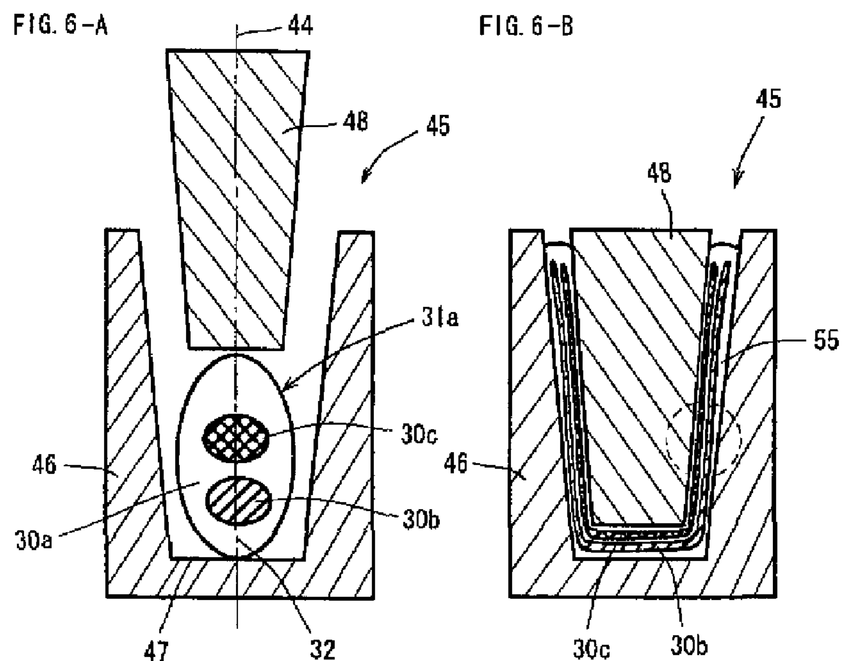
FIG. 6-A
44
48
45
31a
30c
46
30a
30b
47
32
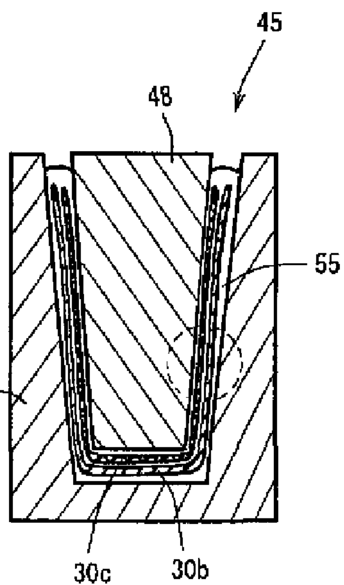
FIG. 6-B
45
48
55
46
30c
30b
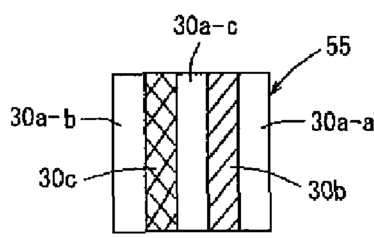
FIG. 6-C
30a-c
55
30a-b
30a-a
30c
30b
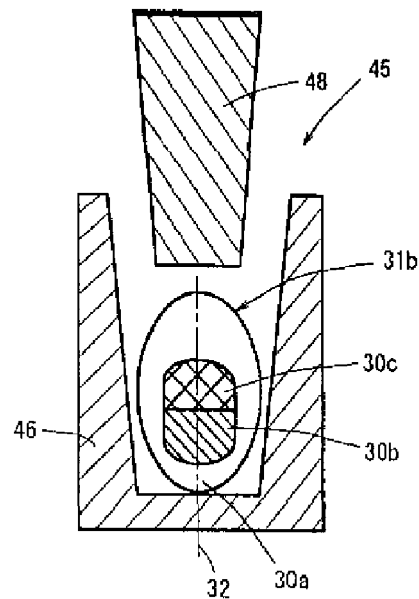
FIG. 7-A
48
45
31b
30c
46
30b
32
30a
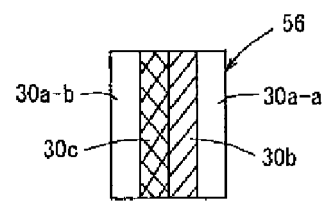
FIG. 7-B
56
30a-b
30a-a
30c
30b

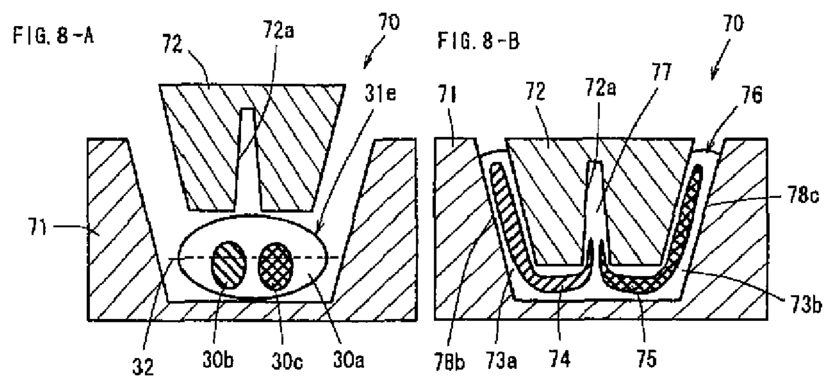
FIG. 8-A
72
72a
70
31e
71
32
30b
30c
30a
FIG. 8-B
70
71
72
72a
77
76
78c
73b
78b
73a
74
75
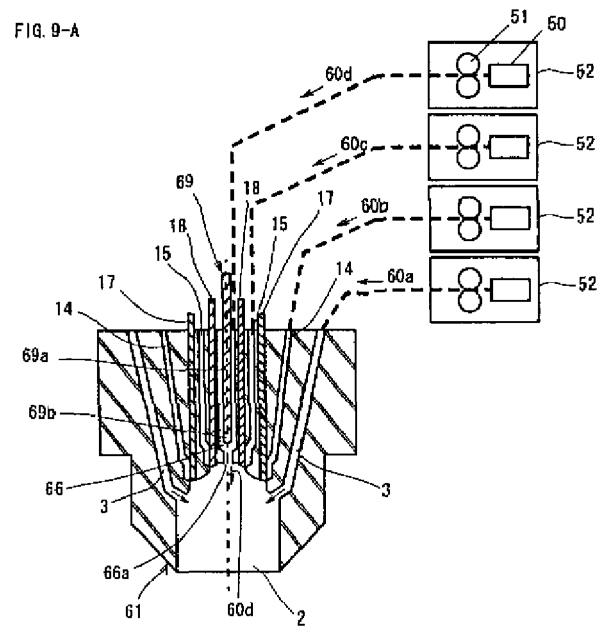
FIG. 9-A
51
60
60d
52
60c
52
69
18
17
60b
52
16
15
15
14
60a
52
17
14
69a
69b
66
3
3
66a
61
60d
2
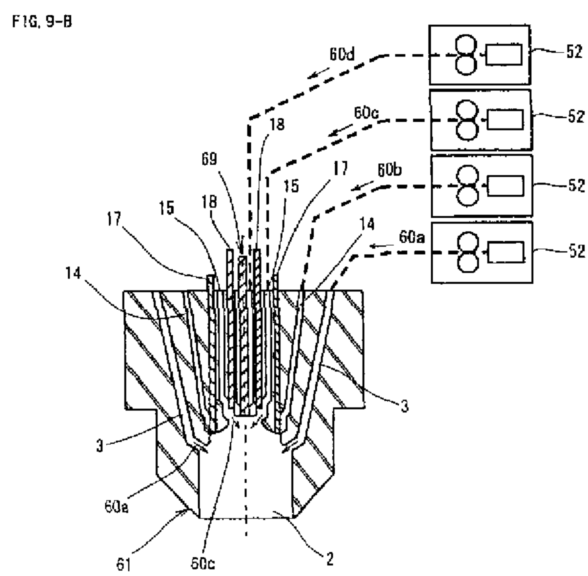
FIG. 9-B
60d
52
60c
52
18
69
17
60b
52
15
18
15
17
14
60a
52
14
3
3
60a
61
60c
2

FIG. 9-C
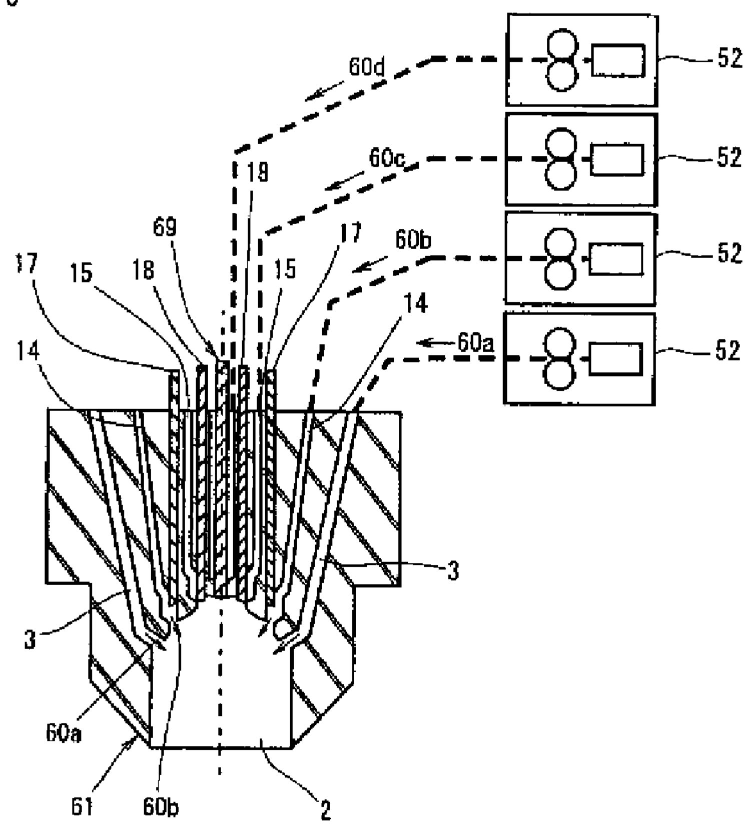
FIG. 9-D
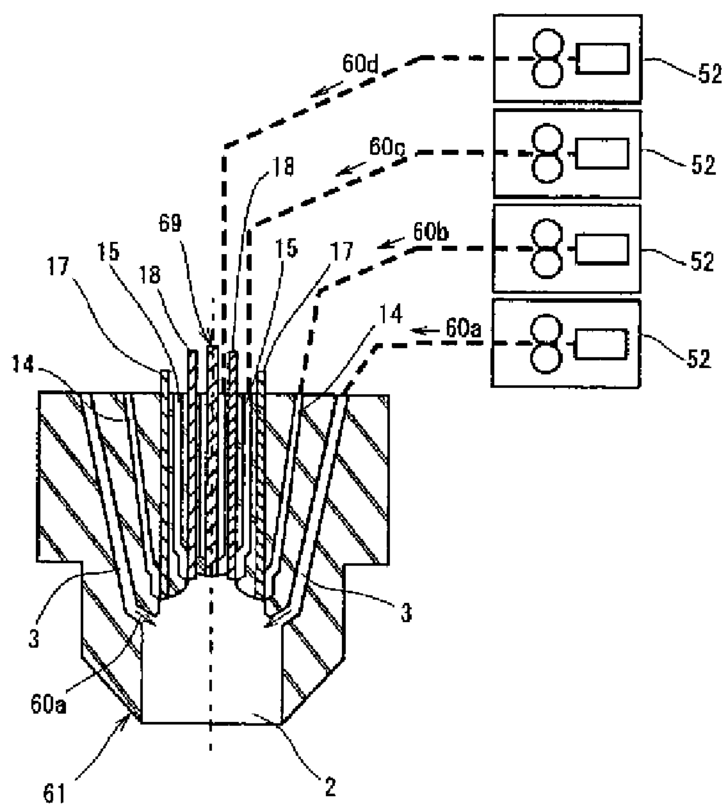

FIG. 10-A
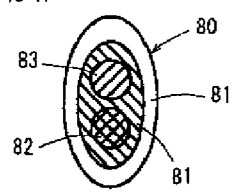
FIG. 10-B
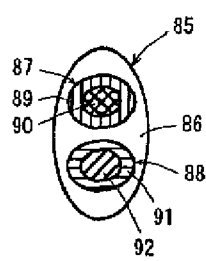
FIG. 10-C
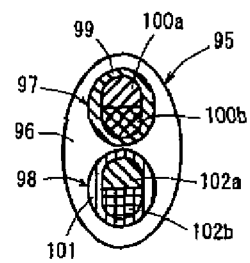
FIG. 11-A
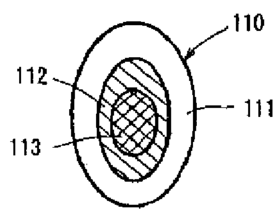
FIG. 11-B
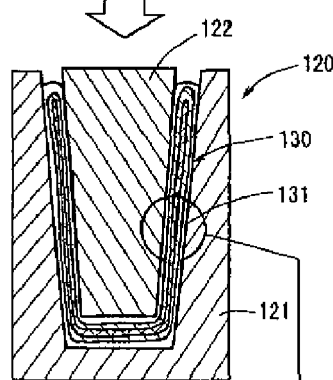
FIG. 11-C
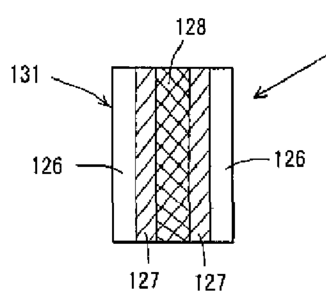

EXTRUSION FEED DEVICE FOR COMPOSITE RESIN AND COMPOSITE RESIN MASS

TECHNICAL FIELD

The present invention relates to an extrusion feed device for a composite resin that molds resins plasticized with an extruder into a composite resin mass having a desired resin distribution to form a resin mass to be supplied for compression molding or the like, and relates to a composite resin mass obtained by the extrusion feed device.

BACKGROUND ART

A method by which a molten resin mass is compression molded by coaction of a female die and a male die of a metal die is known as a method for molding synthetic resin containers such as PET bottles and closures from synthetic resins for closing the mouth sections of the containers. It is possible to mold a molten resin mass to a final container shape by compression molding, or to mold the mass to a pre-molded body (referred to hereinbelow as "preform") for a container and then mold the preform to the final container shape via a subsequent process such as blow molding. When a container is molded, a molten resin extruded from an extruder is cut to obtain a molten resin mass of a column-like shape that falls into a cavity formed in a female die. The molten resin mass located inside the cavity is compression molded by pressing a male die, which is a metal die core, into the molten resin mass, thereby molding the mass into a preform or a final container shape between the female die and the male die. When a closure is molded, similarly to container molding, a molten resin mass is cut from a molten resin, and the molten resin mass is dropped into a cavity in a female die and molded to a final shape of the closure or a pre-molded body thereof.

In order to improve functionality, for example, gas barrier properties and mechanical properties of containers or container lids using synthetic resins as starting materials, or to enable the use of inexpensive recycled resins, multilayer resin starting materials comprising an auxiliary resin layer having the aforementioned properties as an intermediate layer on the inner side of a main resin layer have been often used in the past. In such case, molten resin mass supplied to compression molding are cut from an extruder as composite resin mass comprising these resins. For example, devices in which resin channels for feeding the resins merge in an extrusion channel, an intermittent pressurizing mechanism is provided between an intermediate layer resin extruder and an intermediate layer resin channel, and an intermediate resin layer that is extruded intermittently is sealed in a drop-like form inside the inner and outer layer resins. (Ref. Patent Documents 1-3)

Patent Document 1:
Japanese Publication of Examined Application No. 2-60499
Patent Document 2:
Japanese Published Patent Application No. 2003-39531
Patent Document 3:
Japanese Published Patent Application No. 2003-33964

The composite molten resin mass that can be formed with such extrusion feed devices are limited to mass in which an auxiliary resin of one type is enclosed in an outer resin that is a main resin and mass in which auxiliary resins of two types are enclosed in the outer resin in inclusion relation with each other, as shown in FIG. 11-A. For example, as a composite resin mass comprising three resins, a multilayer molten resin mass 110 composed of resins of three types, namely, a main resin 111 and auxiliary resins 112, 113 that are in inclusion relation in a sequence from the outside to the inside, is formed as an intermediate product, as shown in FIG. 11-A. Where the multilayer molten resin mass 110 is compression molded with a die molding apparatus 120 comprising a female die 121 and a male die 122, as shown in FIG. 11-B, a container 130 can be formed that comprises a total of five layers of three types, namely, outermost resin layers 126, 126 comprising the main resin 111, intermediate resin layers 127, 127 comprising the first auxiliary resin 112, and a resin layer 128 that is an innermost layer comprising the second auxiliary resin 113. With the method for molding the resin mass, only a layer configuration that is symmetrical in the thickness direction, as shown in FIG. 11-C, can be molded as a wall portion 131 of the container 130. Such molded products do not necessary meet a demand for increased variety of layer configuration.

For example, where a resin having an oxygen barrier ability is used as the first auxiliary resin and a resin having a moisture barrier ability is used as the second auxiliary resin to obtain a container having an oxygen barrier ability and a moisture barrier ability, the composite resin mass obtained with the above-described conventional extrusion feed devices is as shown in FIG. 11-A, and the wall configuration of the container obtained by compression molding the composite resin mass is a five-layer configuration having two oxygen barrier resin layers, as shown in FIG. 11-C. Therefore, each oxygen barrier layer has to be decreased in thickness correspondingly to the necessary amount of resin, a suitable layer thickness cannot be obtained and the container can be ruptured during use or a sufficient oxygen barrier function cannot be ensured. These problems can be resolved by increasing the amount of resin with oxygen barrier ability, but the cost increases accordingly. Yet another resultant drawback is that the wall thickness of the container becomes larger than necessary. The problem can be effectively resolved by configuring each layer composed of an auxiliary resin having the desired functionality of respective individual layers, but such a resolution is impossible with the conventional extrusion feed devices for a composite resin extrusion material because, as described above, other resin layers, except an auxiliary resin positioned in the center zone, are always in the form of two layers disposed symmetrically with respect to the center section in the thickness direction. Therefore there is a need for a device making it possible to feed resin extruded materials of multiple types into a single discharge passage so that the feed position and feed period of each extruded material can be selected appropriately and to form composite resins having a variety of layer configurations in which resin layers can be arranged arbitrarily.

DISCLOSURE OF THE INVENTION

Problem to be Solved by the Invention

Accordingly, it is an object of the present invention to provide an extrusion feed device for a composite resin in which a feed of resin extruded materials of multiple types can be received and composite resin extruded materials in a variety of forms having a variety of layer configurations that are not necessarily symmetrical can be formed, although the device has a structure with a single discharge passage. Another object of the present invention is to provide a composite resin mass of a form such that makes it possible to obtain multilayered compression molded products having a variety of asymmetrical layer configurations.

Means for Solving Problem

The extrusion feed device for a composite resin in accordance with the present invention that resolves the above-described problems comprises: a discharge passage for delivering a composite resin extruded material comprising a plurality of types of resin extruded materials; at least one cylindrical flow passage that is open in at least one annular opening that is formed annularly at an upstream side end part of the discharge passage to feed the resin extruded materials; and an opening/closing valve that is provided to be capable of opening/closing the cylindrical flow passage.

With the extrusion feed device for a composite resin, because at least one cylindrical flow passage is open/close controlled by a respective opening/closing valve, each resin extruded material can be fed in a cylindrical fashion from a stationary annular opening of each cylindrical flow passage of the selected opening/closing valve and composite resin extruded material of a great variety of types of the resin extruded materials and composite structures can be extruded from the discharge passage according to the selection of the cylindrical flow passage that has to be opened and the appropriate opening/closing timing of the selected opening/closing valve.

In the extrusion feed device for a composite resin, the annular opening where the cylindrical flow passage is open can be opened in a different position in the radial direction for each of the cylindrical flow passages, and the opening/closing valve can be a cylindrical opening/closing valve that opens and closes the cylindrical flow passage by reciprocating in the axial line direction of the discharge passage. With this extrusion feed device for a composite resin, respective resin extruded materials are discharged as cylindrical resin extruded materials having an inner-outer positional relation in the discharge passage from annular openings that have a multiple annular configuration and are open in positions with different diameters. Such resin extruded materials can provide composite structures having the desired regularity during subsequent molding such as compression molding. The annular openings of multiple annular configuration can be arranged in a multiple concentric fashion, and in this case the respective resin extruded materials can be discharged as resin extruded materials having regularity, that is, axial symmetry with respect to the center axial line of the discharge passage.

In the extrusion feed device for a composite resin, three or more cylindrical flow passages can be concentrically provided and two or more cylindrical opening/closing valves can be operated independently from each other. With this extrusion feed device for a composite resin, because three or more cylindrical flow passages are concentrically provided and the cylindrical opening/closing valves can be operated independently from each other, composite resin extruded materials having various composite structures comprising three or more types of resin extruded materials can be formed.

The extrusion feed device for a composite resin comprises a center flow passage that is open in a center portion of the upstream side end part of the discharge passage. With this extrusion feed device for a composite resin, composite resin extruded materials having even greater variety of composite structures can be formed by discharging a resin extruded material also from the center flow passage into the discharge passage.

The extrusion feed device for a composite resin that comprises a center flow passage can be so configured that the center flow passage is opened and closed by a center opening/closing valve. With such extrusion feed device for a composite resin, the feed of the resin extruded material from the center flow passage into the discharge passage and the termination thereof can be arbitrarily controlled by opening and closing the center opening/closing valve. Therefore, composite resin extruded materials having even greater variety of composite structures can be formed.

In the extrusion feed device for a composite resin, the composite resin extruded material can be cut off in an outlet port of the discharge passage. The composite resin extruded material that is extruded from the outlet portion of the discharge passage can be cut with a cutter disposed in the outlet port of the discharge passage or a cutter provided at a grasping body that grasps the cut-off composite resin extruded material and can be supplied in the form of composite extruded mass, directly or after conveying, to subsequent processing such as compression.

In the extrusion feed device for a composite resin, the resin extruded material can be a molten resin, and the composite resin extruded material can be a composite molten resin comprising a plurality of types of the molten resins. By making the resin extruded material a molten resin, the composite resin extruded material becomes a composite molten resin comprising a plurality of molten resins and resin molded materials having a variety of composite structures can be obtained in subsequent processing such as compression.

In the extrusion feed device for a composite resin, the composite molten resin can be a multilayer molten resin in which the molten resins are laminated in layers. Because each resin extruded material is fed in a cylindrical fashion from the annular openings of each discharge passage, a multilayer molten resin can be formed in which a resin of a different type is enclosed in the resin of the outer layer, and a composite resin mass can be formed by cutting.

On the other hand, the composite resin mass in accordance with the present invention that resolves the above-described problems comprises a main resin and a plurality of auxiliary resins of at least two types that are included in said main resin and have no inclusion relation with each other.

With such composite resin mass, because a plurality of auxiliary resins are disposed without inclusion relation with each other inside the main resin, a plurality of auxiliary resins expand independently from each other according to the position thereof in the resin mass and the compression direction inside the main resin and a multilayer compressed molded products having various layer configuration that are not necessarily symmetrical, when viewed in wall cross section, can be obtained.

The posture and molding method of the composite resin mass can be determined appropriately according to the desired layer configuration of the compression molded product. In other words, the composite resin mass can be formed to have an substantially symmetrical shape having a center axial line and the auxiliary resins can be arranges side by side on the straight line so as to match approximately the center axial line.

In the composite resin mass, the center axial line can be made to coincide with a compression direction when the composite resin mass is compression molded. In the case of such arrangement, each auxiliary resin is laminated and compressed in the same compression direction. Therefore, auxiliary resins expand as intermediate layers that are stacked parallel to each other inside the layer formed from the main resin.

Further, in the composite resin mass, the center axial line can be placed in a direction perpendicular to a compression direction when the composite resin mass is compression molded. In the case of an such arrangement, the auxiliary resins are present side by side in the transverse direction with respect to the compression direction and are compressed independently parallel to each other. Therefore, each auxiliary resin expands independently as an intermediate layer inside the layer formed from the main resin.

In the composite resin mass, the main resin can comprise resins of a plurality of types in the form of multiple layers. With such a composite resin mass, each of the resins of a plurality of types in the form of multiple layers is compression molded in the compression molding process, and the formation of a multilayer structure is ensured in the entire region, regardless of the type of the auxiliary resin.

In the composite resin mass the auxiliary resin can comprise resins of a plurality of types in the form of multiple layers or multiple mass. With such a composite resin mass, molded products with a variety of multilayer structures can be obtained, the structure thereof depending on such conditions as the posture and compression direction of resin mass during compression molding and also on the mutual arrangement of auxiliary resin mass, that is, whether they are in contact with each other or separate from each other.

Effect of the Invention

The extrusion feed device for a composite resin in accordance with the present invention comprises a discharge passage for delivering a composite resin extruded material comprising a plurality of types of resin extruded materials, one or two or more one cylindrical flow passage that is open in one or two or more annular opening that is formed annularly at an upstream side end part of the discharge passage to feed the resin extruded materials, and an opening/closing valve provided so that it can open/close the cylindrical flow passage. Therefore, the feed of the resin extruded material from at least one cylindrical flow passage can be controlled by the opening/closing valve, resin extruded materials of a plurality of types are fed from respective annular openings at appropriate timings, and a composite resin extruded material is formed in which resin extruded materials of auxiliary resins of each type are enclosed in the resin extruded material of the main resin. As a result, although the extrusion feed device for a composite resin has a structure with a single discharge passage, resin extruded materials of multiple types can be fed in a variety of forms from annular openings.

On the other hand, because the composite resin mass in accordance with the present invention comprises a main resin and a plurality of auxiliary resins of at least two types that are included in said main resin and have no inclusion relation with each other. Therefore, each of a plurality of auxiliary resins expands individually in the main resin according to the position thereof in the resin mass and the compression direction during die molding such as compression molding and blow molding, the desired resin layered structure of three or more layers that is asymmetrical can be also obtained, and multilayer compression molded products having a variety of layer configurations that are not necessarily symmetrical when viewed in the wall cross section can be obtained. Therefore, a composite resin mass can be obtained that has a form making it possible to obtain a multilayer compression molded product having a variety of layer configurations that are not necessarily symmetrical. Thus, performance and productivity of molded products are increased by introducing a plurality of resins that differ in properties into a main resin in a suitable order.

BRIEF DESCRIPTION OF THE DRAWINGS

FIG. 1-A illustrates an embodiment of the extrusion feed device for a composite resin in accordance with the present invention in a state thereof in which the cylindrical opening/closing valve is open;

FIG. 1-B is a cross-sectional schematic view illustrating a state in which the cylindrical opening/closing valve is closed;

FIG. 1-C is a cross-sectional schematic view illustrating a modification example of the extrusion feed device for a composite resin shown in FIG. 1-A;

FIG. 2-A illustrates another embodiment of the extrusion feed device for a composite resin in accordance with the present invention in a state thereof in which all the cylindrical opening/closing valves are open;

FIG. 2-B is a cross-sectional schematic view illustrating a state in which all the cylindrical opening/closing valves are closed;

FIG. 3-A is a cross-sectional schematic view illustrating another embodiment of the extrusion feed device for a composite resin in accordance with the present invention;

FIG. 3-B is a cross-sectional schematic view illustrating an embodiment of the device shown in FIG. 3-A in which an opening/closing valve is provided in a center flow passage;

FIG. 4-A is a cross-sectional schematic view illustrating yet another embodiment of the extrusion feed device for a composite resin in accordance with the present invention in a state thereof in which the cylindrical opening/closing valve and the center opening/closing valve are closed;

FIG. 4-B is a cross-sectional schematic view illustrating yet another embodiment of the extrusion feed device for a composite resin in accordance with the present invention in a state thereof in which only the cylindrical opening/closing valve is open;

FIG. 4-C is a cross-sectional schematic view illustrating yet another embodiment of the extrusion feed device for a composite resin in accordance with the present invention in a state thereof in which only the center opening/closing valve is open;

FIG. 4-D is a cross-sectional schematic view illustrating yet another embodiment of the extrusion feed device for a composite resin in accordance with the present invention in a state thereof in which the opening/closing valves of both types are open;

FIGS. 5-A to 5-E are schematic views illustrating the form of composite resin mass that can be formed with the extrusion feed device for a composite resin shown in FIG. 4;

FIGS. 6-A and 6-B are schematic explanatory drawings illustrating the manufacture of a cup-shaped container by compression molding of the composite resin mass shown in FIG. 5-A; FIG. 6-C is an enlarged cross-sectional view thereof;

FIG. 7-A is a schematic explanatory drawing illustrating the manufacture of a cup-shaped container by compression molding of the composite resin mass shown in FIG. 5-B; FIG. 7-B is an enlarged cross-sectional view thereof;

FIGS. 8-A and 8-B are schematic explanatory drawings illustrating the manufacture of a cup-shaped container by compression molding of the composite resin mass shown in FIG. 5-E;

FIG. 9-A is a cross-sectional schematic view illustrating the opening/closing state of the opening/closing valves of another embodiment of the extrusion feed device for a composite resin in accordance with the present invention;

FIG. 9-B is a cross-sectional schematic view illustrating another opening/closing state of the opening/closing valves of another embodiment of the extrusion feed device for a composite resin in accordance with the present invention;

FIG. 9-C is a cross-sectional schematic view illustrating another opening/closing state of the opening/closing valves of another embodiment of the extrusion feed device for a composite resin in accordance with the present invention;

FIG. 9-D is a cross-sectional schematic view illustrating another opening/closing state of the opening/closing valves of another embodiment of the extrusion feed device for a composite resin in accordance with the present invention;

FIGS. 10-A to 10-C are schematic drawings illustrating yet another composite resin mass in accordance with the present invention; and FIG. 11-A is a cross-sectional schematic view illustrating an example of the conventional composite resin mass. FIG. 11-B is a schematic explanatory drawing illustrating the manufacture of a cup-shaped container by compression molding of the composite resin mass. FIG. 11-C is a cross-sectional enlarged view of the container obtained.

EXPLANATION OF LETTERS OR NUMERALS

1, 1', 11, 21*a*, 21*b*, 31, 61 extrusion feed device for a composite resin
2 discharge passage
2*a* upstream side end part
2*b* downstream side end part
3, 4; 14, 15; 23, 24 cylindrical flow passage
3' non-cylindrical flow passage
3*a*, 4*a*; 14*a*, 15*a*, 23*a*, 24*a* annular opening
3*a'* non-annular opening
4*b*; 14*b*, 15*b*; 23*b*, 24*b*, 25*b* valve seat
5; 16; 25; 36; 66 center flow passage
36*a*; 66*a* center outlet port
7; 17, 18; 26, 27 cylindrical opening/closing valve
7*a*; 17*a*, 18*a*; 26*a*, 27*a* cylindrical body
7*b*; 17*b*, 18*b*; 26*b*, 27*b* distal end portion
9, 44 center axial line
25*a* opening
31*a*, 31*b*, 31*c*, 31*d*, 31*e*, 80, 85, 95 composite resin mass
28; 39; 69 center opening/closing valve
28*a*, 39*a* body
28*b*, 39*b* distal end portion
45, 70 molding die
46, 71 female die
48, 72 male die
50 extruder
51 metered discharge device
52 resin feed means
53, 56, 76 cup-shaped container

BEST MODE FOR CARRYING OUT THE INVENTION

An embodiment of the extrusion feed device for a composite resin in accordance with the present invention will be described below with reference to the appended drawings. In the embodiment described below, a resin extruded material is assumed to be a molten resin, and a composite resin extruded material is assumed to be a composite molten resin. FIG. 1-A and FIG. 1-B are cross-sectional schematic views illustrating an embodiment of the extrusion feed device for a composite resin in accordance with the present invention. FIG. 1-A shows a state in which a cylindrical opening/closing valve is open, FIG. 1-B shows a state in which the cylindrical opening/closing valve is closed, and FIG. 1-C is a cross-sectional schematic view of a modification example of the embodiment shown in FIG. 1-A.

An extrusion feed device 1 for a composite resin shown in FIG. 1-A and FIG. 1-B comprises a discharge passage 2 for delivering a composite molten resin. In the discharge passage 2, the feed of the molten resin is received by an upstream side end part 2*a* via the below-described cylindrical flow passages 3, 4 and center flow passage 5, and a composite molten resin that is a multilayer molten resin of the molten resins is extruded from a downstream side end part 2*b*. A plurality of cylindrical flow channels 3, 4 are opened at concentric annular openings 3*a*, 4*a* to feed resins of a plurality of types in the upstream side end part 2*a* of the discharge passage 2. In this example, the cylindrical flow passages 3, 4 are formed so that the annular openings 3*a*, 4*a* have the smallest diameters and that the diameters increase toward the upstream side. Resin feed means 52 having an extruder 50 and a metered delivery device 51, such as a gear pump, connected to the downstream side of the extruder are provided in the upstream side end parts of the cylindrical flow passages 3, 4 and the center passage 5, and the predetermined molten resins are fed into respective flow passages.

The cylindrical flow passage 3 on the outermost side and the center flow passage 5 are opened all the time to the discharge passage 2, and a resin (main resin) 10*a* for an outer layer that forms each composite resin extruded material and a resin 10*c* for the innermost layer are fed to the discharge passage 2. The annular opening 4*a* of the inner cylindrical flow passage 4 is opened and closed by the cylindrical opening/closing valve 7. The annular flow passage 4 is opened in the discharge passage 2 in a state where the annular opening 4*a* is tilted obliquely inwardly. The cylindrical opening/closing valve 7 comprises a cylindrical body 7*a* that has an axial line matching the center axial line 9 of the discharge passage 2. The valve is actuated in the direction parallel to the center axial line 9 by a drive unit (not shown in the figure). Therefore, when the cylindrical opening/closing valve 7 is driven and a distal end portion 7*b* of the cylindrical body 7*a* sits on a valve seat 4*b* as shown in FIG. 1-B, the annular opening 4*a* is closed and the feed of the molten resin 10*b* is stopped. By the backward drive of the cylindrical opening/closing valve 7, the annular opening 4*a* is opened and the molten resin 10*b* is fed from the cylindrical flow passage 4 into the molten resin 10*a* for the outer layer. A continuous multilayer resin that is extruded from the downstream side end part 2*b* of the discharge passage 2 is cut between the molten resins 10*b*, 10*b* for the inner layers located sequentially (before and after) in the extrusion direction, whereby the multilayer resin is cut into individual composite resin mass in which the molten resin (auxiliary resin) 10*b* for the inner layer is enclosed inside the molten resin 10*a* for the outer layer and the resin 10*c* for the innermost layer.

An extrusion feed device 1' shown in FIG. 1-C is a modification example of the embodiment shown in FIG. 1-A. In the above-described embodiment, the resin feed passage for the outermost layer constituted by the main resin was also a cylindrical flow passage, but the resin feed passage for the outermost layer does not necessarily have to be formed as a cylindrical flow passage. As shown in this embodiment, this passage may also be a non-cylindrical flow passage 3' such as one flow passage from a resin feed means 52 that is directly opened in part of the circumferential surface of the upstream side end portion of a discharge passage 2, or a manifold flow passage, or a circular-arc flow passage that is open as a circular arc. Therefore, in this case, the opening facing the discharge passage 2 becomes a non-annular opening 3*a'*. The possibility of thus forming the resin feed passage for the outermost layer as a non-cylindrical flow passage is also valid for all the below-described embodiments.

FIG. 2 is a cross-sectional schematic view illustrating another embodiment of the extrusion feed device for a composite resin in accordance with the present invention. FIG. 2-A shows a state in which the cylindrical opening/closing valves are open, and FIG. 2-B shows a state in which the cylindrical opening/closing valves are closed. Structural elements of this extrusion feed device 11 for a composite resin that are common with the extrusion feed device 1 for a composite resin shown in FIG. 1 are assigned with the reference numerals identical to the reference numerals used in FIG. 1 and the redundant explanation thereof is omitted. Two concentric cylindrical flow passages 14, 15 are formed inside the outermost cylindrical flow passage 3. The outermost cylindrical flow passage 3 and a center flow passage 16 normally feed respective resins 20*a*, 20*d* through the discharge passage 2. Annular openings 14*a*, 15*a* of the cylindrical flow passages 14, 15 are opened and closed by cylindrical opening/closing valves 17, 18, respectively. Thus, the cylindrical opening/closing valves 17, 18 are formed to have a cylindrical shape having an axial line matching the center axial line 9 of the discharge passage 2, and the valves can be independently actuated in the direction parallel to the center axial line 9 by a drive device (not shown in the figure). When a cylindrical body 17*a* (18*a*) of the cylindrical opening/closing valve 17 (18) is driven forward and a distal end portion 17*b* (18*b*) sits on a valve seat 14*b* (15*b*) and assumes a position shown in FIG. 2-B, the cylindrical opening/closing valve 17 (18) closes the annular opening 14*a* (15*a*) and stops the feed of a molten resin 20*b* (20*c*). If the cylindrical body 17*a* (18*a*) is retracted, the cylindrical opening/closing valve 17 (18) opens the annular opening 14*a* (15*a*), and the molten resin 20*b* (20*c*) is fed from the cylindrical flow passage 14 (15) between a molten resin 20*a* for an outer layer and a molten resin 20*d* for an inner layer that are fed into the discharge passage 2.

Other embodiments of the extrusion feed device for a composite resin in accordance with the present invention are shown in FIG. 3-A and FIG. 3-B. In each embodiment shown in FIG. 3, basic components are assigned with reference numerals identical to the reference numerals used in the embodiment shown in FIG. 2, and the redundant explanation thereof is omitted. An extrusion feed device 21*a* for a composite resin that is shown in FIG. 3-A comprises a normally opened center flow passage 25 and concentric cylindrical flow passages (an outer cylindrical flow passage 23 and an inner cylindrical flow passage 24) for which the center flow passage 25 serves as a center. Cylindrical opening/closing valves 26, 27 having axial lines that match a center axial line 9 of the discharge passage 2 can be independently actuated in the direction parallel to the center axial line 9 by a drive device (not shown in the figure) and can open and close annular openings 23*a*, 24*a* of the cylindrical flow passages 23, 24. More specifically, when a cylindrical body 26*a* (27*a*) of the cylindrical opening/closing valve 26 (27) is driven forward and a distal end portion 26*b* (27*b*) sits on a valve seat 23*b* (24*b*), the cylindrical opening/closing valve 26 (27) closes the annular opening 23*a* (24*a*) and stops the feed of a molten resin 20*a* (20*b*). If the cylindrical body 26*a* (27*a*) is retracted, the cylindrical opening/closing valve 26 (27) opens the annular opening 23*a* (24*a*), and the molten resin 20*a* (20*b*) is fed from the cylindrical flow passage 23 (24) around the molten resin 20*c* for an inner layer inside the discharge passage 2. Because the feed of resin from the cylindrical flow passages 23, 24 can be stopped and restarted at random, the diversity of forms of resin extruded materials is increased. Furthermore, in an extrusion feed device 21*b* for a composite resin shown in FIG. 3-B, a center opening/closing valve 28 is provided in the center flow passage 25 in addition to the cylindrical opening/closing valves for the cylindrical flow passages 23, 24 in FIG. 3-A, and the center opening closing valve can be independently actuated in the direction parallel to the center axial line 9 by a drive device (not shown in the figure). The opening 25*a* is opened and closed when a distal end portico 28*b* of a body 28*a* of the center opening/closing valve 28 sits on and is separated from a valve seat 25*b* of the center flow passage 25, thereby making it possible to control the feed of the molten resin 20*c* into the discharge passage 2. Because opening/closing mechanisms are provided in all three flow passages, the variety of forms of the extruded resin is further increased.

FIG. 4-A to FIG. 4-D are cross-sectional schematic views illustrating yet another embodiment of the extrusion feed device for a composite resin in accordance with the present invention. FIG. 4-A shows a state A in which both the cylindrical opening/closing valve and the center opening/closing valve are closed. FIG. 4-B shows a state B in which the cylindrical opening/closing valve is open and the center opening/closing valve is closed. FIG. 4-C shows a state C in which the cylindrical opening/closing valve is closed and the center opening/closing valve is open. FIG. 4-D shows a state D in which both the cylindrical opening/closing valve and the center opening/closing valve are open. Structural elements of this extrusion feed device 31 for a composite resin that are common with the extrusion feed device 1 for a composite resin shown in FIG. 1 are assigned with the reference numerals identical to the reference numerals used in FIG. 1 and the redundant explanation thereof is omitted. A center opening/closing valve 39 can stop the feed of the molten resin 30*c* from the center flow passage 36 when a distal end portion 39*b* formed in a body 39*a* is tightly fitted into a center outlet port 36*a* (FIG. 4-C) in which the center flow passage 36 is open to the discharge passage 2. The center opening/closing valve 39 can be actuated independently from the cylindrical opening/closing valve 7.

FIG. 5 is a schematic diagram illustrating the form of a composite resin mass that can be formed with the extrusion feed device 31 for a composite resin shown in FIG. 4. FIG. 5-A shows a composite resin mass 31*a* formed when the extrusion feed device 31 for a composite resin shown in FIG. 4 is operated through the following succession of states: state A→state B→state A→state C→state A. A molten resin 30*b* is fed (state B) from a cylindrical flow passage 4 into a molten resin 30*a* that is fed from a cylindrical flow passage 3. Then, the cylindrical flow passage 4 is closed and only the molten resin 30*a* is again fed from the cylindrical flow passage 3 (state A). A molten resin 30*c* is thereafter fed (state C) from the center flow passage 36, then the center flow passage 36 is closed, and the process returns to the state (state A) in which only the molten resin 30*a* is fed from the cylindrical flow passage 3. Finally, the molten resin 30*a* is fed only from the cylindrical flow passage 3, and then the resin mass 31*a* is formed by cutting from the following resin. FIG. 5-B shows a composite resin mass 31*b* formed when the extrusion feed device 31 for a composite resin is operated through the following succession of states: state A→state B→state C→state A. After state B, a transition is made directly to state C, without the operation of state A, whereby the composite resin mass 31*b* is formed in which the molten resin 30*c* and the molten resin 30*b* are in contact with each other. FIG. 5-C shows a composite resin mass 31*c* formed when the extrusion feed device 31 for a composite resin is operated through the following succession of states: state A→state B→state D→state B→state A. The passages are successively opened from the outer side, i.e., from the cylindrical flow passage 4 to the center flow passage 36 and successively closed from the center flow passage 36 to the cylindrical flow passage 4, whereby the composite resin mass 31*c* is formed in which the molten resins 30*b*, 30*c* are enclosed as concentric shells in the molten resin 30*a*. FIG. 5-D shows a composite resin mass 31*d* formed when the extrusion feed device 31 for a composite resin is operated through the following succession of states:

state A→state D→state A. In this case, the composite resin mass 31*d* is formed in which the molten resin 30*b* surrounds the molten resin 30*c* in a circle inside the molten resin 30*a*. A composite resin mass 30*e* shown in FIG. 5-E is equivalent to the molten resin mass 31*a* extruded in a state shown in FIG. 5-A that was rotated clockwise through 90 degrees, and this composite resin mass is placed inside a cavity by rotating the molten resin mass extruded from the extrusion feed device 31 for a composite resin in the process of feeding to the mold through 90 degrees.

In the composite resin mass 31*a*-31*e* shown in FIGS. 5-A to 5-E, the molten resin 30*a* constitutes a main resin serving at least as an outer surface layer of a multilayer compression molded material when a molded body is molded, and the molten resins 30*b*, 30*c* constituting auxiliary resins that are included in the main resin. In the composite resin mass 31*a*-31*e* shown in FIG. 5, the molten resins 30*b*, 30*c* constituting the auxiliary resins are not in the inclusion relation with each other, with the exception of the composite resin mass 31*c* shown in FIG. 5-C. As a result, as will be described hereinbelow, a multilayer compression molded product having a layer configuration that is not symmetrical in the thickness direction can be obtained and a variety of layer configurations can be formed.

FIG. 6 is a schematic explanatory drawing illustrating the manufacture of a cup-shaped container by compression molding of the composite resin mass 31*a* shown in FIG. 5-A. FIG. 6-A is a schematic view illustrating a state in which the composite resin mass 31*a* is placed in a mold. FIG. 6-B is a cross-sectional schematic view illustrating a state in which the composite resin mass 31*a* was compression molded from the said state. FIG. 6-C is an enlarged cross-sectional view of a molded body obtained by compression molding of the composite resin mass 31. In compression molding of the composite resin mass 31*a*, as shown in FIG. 6-A, the composite resin mass 31*a* is placed into a female die 46 of a molding die 45. At this time, the longitudinal center axial line 32 of the composite resin mass 31*a* matches a center axial line 44 that is a compression direction of the molding die 45 where the composite resin mass is compression molded, the molten resin 30*b* constituting a first auxiliary resin is disposed on the lower side, and the molten resin 30*c* constituting a second auxiliary resin is disposed on the upper side. If the composite resin mass 31*a* is compression molded by inserting a male die 48 into the female die 46, not only the main resin, but also the auxiliary resins flow into a gap between the female die 46 and the male die 48 of the molding die 45, as shown in FIG. 6-B, and a cup-shaped container 55 is molded. Because the molten resins 30*b*, 30*c* constituting the auxiliary resins are superimposed and compressed in the same compression direction, the molten resins 30*b*, 30*c* expand as intermediate layers that are stacked parallel to each other inside the layer formed from the main resin (molten resin 31*a*), and the container 55 is molded as a resin molded product of a multilayer structure in which the main resin and two layers of auxiliary resins form respective layers in all the portions.

According to the enlarged cross-sectional view of part of the container 55 that is shown in FIG. 6-C, the molten resin 30*a* that is a main resin serves as an outermost layer 30*a-a*, an innermost layer 30*a-b*, and an intermediate layer 30*a-c*, the molten resin 30*b* serves as an outer intermediate layer sandwiched between the outermost layer 30*a-a* and the intermediate layer 30*a-c*, and the molten resin 30*c* serves as an inner intermediate layer sandwiched between the innermost layer 30*a-b* and the intermediate layer 30*a-c*. Therefore, the container 55 is formed of a total of 5 layers. Thus, in this case, both the first auxiliary resin and the second auxiliary resin can be formed as one layer and the desired-layer thickness can be obtained. In the case where the molten resin 30*b* is a resin with barrier properties and the molten resin 30*c* is a resin capable of absorbing oxygen, when a contents is packed by using such a container 55, the permeation of oxygen from the outside of the container 55 is prevented by the outer intermediate layer, and oxygen located inside the container 55 is absorbed by the inner intermediate layer. As a result, the inside of the container 55 is maintained at a low oxygen concentration and the contents can be prevented from deterioration. Further, in the case where the molten resin 30*b* is a resin capable of absorbing oxygen and the molten resin 30*c* is a resin having deodorizing ability or moisture barrier property, when a contents is packed by using such a container 55, the contents can be protected from the odor generated when the contents absorbs oxygen and the contents can be protected from moisture.

FIG. 7 is a schematic explanatory drawing illustrating the manufacture of a cup-shaped container by compression molding of the composite resin mass 31*b* shown in FIG. 5-B. FIG. 7-A is a schematic drawing illustrating a state in which the composite resin mass 31*b* is disposed inside a molding die. FIG. 7-B is an enlarged cross-sectional view of a molded material obtained by compression molding of the composite resin mass 31*b* from the state shown in FIG. 7-A. A cross-sectional schematic view illustrating the state in which the composite resin mass 10 was compression molded is substantially identical to that shown in FIG. 6-B. Accordingly, such view is not shown in the figure. When the composite resin mass 31*b* is compression molded, as shown in FIG. 7-A, the composite resin mass 31*b* is disposed inside the female die 46 of the molding die 45. At this time, similarly to the case illustrated by FIG. 6-A, the center axial line 32 in the longitudinal direction of the composite resin mass 31*b* is aligned with the center axial line that is a compression direction of the molding die 45, the first auxiliary resin 30*b* is disposed on the lower side and the second auxiliary resin 30*c* is disposed on the upper side. By way of compression with the molding die 45, the composite resin mass 31*b* is molded into a cup-shaped container 56 in the same manner as shown in FIG. 6-B. Thus, because the auxiliary resins 30*b*, 30*c* are superimposed and compressed in the same compression direction, the auxiliary resins 30*b*, 30*c* expand as intermediate layers that are stacked parallel to each other inside the layer formed from the main resin 30*a*, and the container 56 is molded as a resin molded product of a multilayer structure in which the main resin 30*a* and the auxiliary resins 30*b*, 30*c* form respective layers in all the portions. In this example, as shown by an enlarged cross-sectional view in FIG. 7-B, the main resin 30*a* serves as an outermost layer 30*a-a* and an innermost layer 30*a-b*, the auxiliary resin 30*b* becomes an outer intermediate layer that is in contact with the outermost layer 30*a-a*, the second auxiliary resin 30*c* becomes an inner intermediate layer that is in direct contact with the outer intermediate layer and the innermost layer 30*a-b*, and a layer comprising the main resin 30*a* is not formed between the two intermediate layers. Therefore, the container 56 is formed of a total of four layers.

FIG. 8 is a schematic explanatory drawing illustrating the manufacture of a cup-shaped container by compression molding of the composite resin mass 31*e* shown in FIG. 5-E. FIG. 8-A is a schematic drawing illustrating the state in which the composite resin mass 31*e* is disposed inside the molding die. FIG. 8-B is a cross-sectional schematic view illustrating a state in which the composite resin mass 31*e* was compression molded from the state shown in FIG. 8-A. In compression molding of the composite resin mass 31*e*, first, as shown in FIG. 5-A, the composite resin mass 31*e* is disposed inside a female die 71 of a molding die 70. At this time, the center axial line 32 of the composite resin mass 31*e* is placed in the direction perpendicular to the compression direction during compression molding of the composite resin mass 31*e*. Therefore, the auxiliary resins 30*b*, 30*c* are disposed on the left and on the right so as to be side by side in the transverse direction with respect to the compression direction. In this example, a groove 72*a* is formed in the center portion of the female die 72. If the female die 71 and the male die 72 are assembled and the composite resin mass 31*e* is compression molded, then the main resin 30*a* will flow in the left-right direction into the gap between the female die 71 and the male die 72 of the molding die 70 and into the groove 72*a* of the male die 72, to form outer layers 73*a* and 73*b*. The auxiliary resins 30*b*, 30*c* are independently compression molded parallel to each other. Thus, practically the entire auxiliary resin 30*b* flows only into the left outer layer 73*a* formed from the main resin 30*a* and expands as an intermediate layer 74, and practically the entire auxiliary resin 30*c* flows only into the right outer layer 73*b* formed from the main resin 30*a* and expands as an intermediate layer 75. Therefore, the composite resin mass 31*e* is formed as a cup- or tray-shaped container 76 that has different layer configurations on the left and right sides. The container 76 has in the center thereof a partition 77 formed correspondingly to the groove 72*a* of the male die 72. When the auxiliary resin 30*b* is a resin with oxygen barrier ability and the auxiliary resin 30*c* is a resin with moisture barrier ability, a contents that has to be prevented from oxygen-induced deterioration is accommodated in a left accommodation portion 78*b*, and a contents that has to be prevented from absorbing and releasing moisture can be accommodated in a right accommodation portion 78*c*, thereby making it possible to accommodate and package the two contents separately.

FIG. 9 is a cross-sectional schematic view illustrating another embodiment of the extrusion feed device for a composite resin in accordance with the present invention. An extrusion feed device 61 for a composite resin shown in FIG. 9-A to FIG. 9-D represents an embodiment in which the extrusion feed device 11 for a composite resin shown in FIG. 2 is provided with a center opening/closing valve 69 in a center flow passage 66. Therefore, only the main structural elements from those common with the extrusion feed device 11 for a composite resin shown in FIG. 2 are assigned with the reference symbols identical to those used in FIG. 2, and the redundant explanation thereof is omitted. Further, the center opening/closing valve 69 may have the structure identical to that of the center opening/closing valve 39 used in the embodiment shown in FIG. 4, and by tightly fitting a distal end portion 69*b* formed at a body 69*a* of the center opening/closing valve 69 into a center outlet port 66*a* where the center flow passage 66 is opened into the discharge passage 2, the center flow passage 66 can be closed and the feed of a molten resin 60*d* through the center flow passage 66 can be stopped. The center opening/closing valve 69 can be operated independently from the cylindrical opening/closing valves 17, 18.

FIG. 9-A shows a state in which molten resins 60*a*, 60*d* are fed into the discharge passage 2 respectively from the normally opened outermost cylindrical flow passage 3 and the cylindrical flow passage 66 in which the center opening/closing valve 69 is open. FIG. 9-B shows a state in which the center opening/closing valve 69 is closed and the cylindrical opening/closing valve 18 provided in the innermost cylindrical flow passage 15 is open to feed the resins 60*a*, 60*c* into the discharge passage 2 from the outermost cylindrical flow passage 3 and the innermost cylindrical flow passage 15. Further, FIG. 9-C shows a state in which the center opening/closing valve 69 and the cylindrical opening/closing valve 18 provided in the innermost cylindrical flow passage 15 are closed and the cylindrical opening/closing valve 17 provided in the intermediate cylindrical flow passage 14 is open to feed the molten resins 60*a*, 60*b* into the discharge passage 2 from the outermost cylindrical flow passage 3 and the intermediate cylindrical flow passage 15. Further, FIG. 9-D shows a state in which the center opening/closing valve 69 and all the cylindrical opening/closing valves 17, 18 are closed to feed only the molten resin 60*a* from the outermost cylindrical flow passage 3 into the discharge passage 2.

FIGS. 10-A to 10-C are schematic drawings illustrating yet another configuration example of the composite resin mass in accordance with the present invention. In a composite resin mass 80 shown in FIG. 10-A, the main resin comprises an outer main resin 81*a* and another main resin 81*b* that is enclosed inside the outer main resin. In the main resin 81*b*, auxiliary resins 82, 83 are enclosed side by side, without mutual inclusion relation. The composite resin mass can be easily obtained with the extrusion feed device 61 for a composite resin shown in FIG. 9.

In a composite resin mass 85 shown in FIG. 10-B, auxiliary resins 87, 88 enclosed in a main resin 86 are composed of a plurality (two in the present example) of resin groups that have no mutual inclusion relation and are arranged side by side along the longitudinal center axial line of the composite resin mass 85. The auxiliary resins 87, 88 can be composed of multiple layers (two layers in this example) of auxiliary resins 89, 90 and 91, 92, respectively. Further, in a composite resin mass 95 shown in FIG. 10-C, auxiliary resins enclosed in a main resin 96 are composed of a plurality (two in the present example) of resins 97, 98 that have no mutual inclusion relation and are arranged side by side along the longitudinal center axial line of the composite resin mass 95. The auxiliary resins 97, 98 can be composed of multiple layers (two layers in this example) of resins, wherein inner resins enclosed into outer resin layers 99, 101 can be in the form of multiple mass (two mass tightly joined together) of resins 100*a*, 100*b*; 102*a*, 102*b*. The composite resin mass 85, 95 can be formed by further increasing the number of cylindrical flow passages having cylindrical opening/closing valves correspondingly to the number of types of the auxiliary resins in the feed device for a composite resin shown in FIG. 9.

Each embodiment of the feed device for a composite resin and the composite resin mass in accordance with the present invention was explained above with reference to the appended drawings, but the feed device for a composite resin and the composite resin mass in accordance with the present invention are not limited to those embodiments and a variety of modifications, additions, and changes thereof are possible. Thus, in the examples, a maximum of three cylindrical flow passages were considered, but it is obvious that a larger number of cylindrical flow passages may be provided. Further, the explanation above assumed that the cylindrical flow passages are continuously opened in the discharge passage, but a configuration with a discontinuous opening is also possible. Therefore, the opening and closing of the opening/closing valves that open and close such cylindrical flow passages can be controlled in a variety of modes, and multilayer resin extruded materials of various types having a large variety of layer configurations can be molded by a molding process such as compression molding. Furthermore, the annular openings where the cylindrical flow passages are open are not necessary concentric and may have a multiple ring-like configuration. The feed of the resin extruded material from the outer cylindrical flow passage may be performed at an appropriate timing, rather than all the time. Further, when the resin extruded material is cut and composite resin mass are formed, a cutter may be disposed in the discharge port to cut successively the resin extruded material that is being extruded, or cutters may be provided at individual clamping jigs for conveying the resin extruded material that was cut.

INDUSTRIAL APPLICABILITY

Although the extrusion feed device for a composite resin in accordance with the present invention has a structure with a single discharge passage, a feed of resin extruded materials of multiple types can be received and composite resin extruded materials of a variety of forms can be formed, for example, a composite resin mass for molding containers of multilayer structure with asymmetrical layer configuration can be obtained, and this extrusion feed device can be applied to extruders of molten resin mass for compression molding of synthetic resin containers, container lids, ejection ports with a multilayer structure, or for molding preforms thereof.

The invention claimed is:

1. An extrusion feed device for a composite resin, comprising:

a discharge passage for delivering a composite resin extruded material comprising two or more kinds of resin extruded materials;

at least one cylindrical flow passage connecting a resin feed device to said discharge passage and disposed upstream of said discharge passage, at least one annular opening disposed at the junction of said at least one cylindrical flow passage and said discharge passage, said at least one annular opening being stationary and being formed annularly at an upstream side end part of said discharge passage to feed said resin extruded materials to said discharge passage; and an opening/closing valve that can open/close control the cylindrical flow passage, wherein said opening/closing valve is a cylindrical opening/closing valve that opens and closes said stationary annular opening of said cylindrical flow passage by reciprocating in the axial line direction of said discharge passage.

2. The extrusion feed device for a composite resin according to claim 1, wherein the extrusion feed device includes at least two cylindrical flow passages and at least two annular openings, wherein said at least two annular openings of said at least two cylindrical flow passages are open in different positions in the radial direction for each of said at least two cylindrical flow passages.

3. The extrusion feed device for a composite resin according to claim 1, wherein the extrusion feed device includes at least three cylindrical flow passages concentrically provided, and wherein the extrusion feed device includes at least two cylindrical opening/closing valves operated independently from each other.

4. The extrusion feed device for a composite resin according to claim 1, further comprising a center flow passage that is open in a center portion of said upstream side end part of said discharge passage.

5. The extrusion feed device for a composite resin according to claim 4, wherein said center flow passage is opened and closed by a center opening/closing valve.

* * * * *